United States Patent [19]

Blanchard

[11] 4,100,695

[45] Jul. 18, 1978

[54] FISHING ROD JIGGING APPARATUS

[76] Inventor: James A. Blanchard, 55 Woodbury St., Keene, N.H. 03431

[21] Appl. No.: 750,765

[22] Filed: Dec. 15, 1976

[51] Int. Cl.² ............................................. A01K 97/10
[52] U.S. Cl. ..................................................... 43/19.2
[58] Field of Search ................................. 43/19.2, 16

[56] References Cited

U.S. PATENT DOCUMENTS

| | | | |
|---|---|---|---|
| 3,031,790 | 5/1962 | Duryea | 43/19.2 |
| 3,550,302 | 12/1970 | Creviston et al. | 43/19.2 X |
| 3,839,810 | 10/1974 | Lagasse | 43/19.2 |

*Primary Examiner*—Hugh R. Chamblee
*Attorney, Agent, or Firm*—Pollock, Vande Sande & Priddy

[57] ABSTRACT

A device for imparting an oscillating or jigging motion to a fishing rod includes a motor directly driving a small gear which meshes with a larger gear connected by a pivoted link to a crank arm mounted on the output shaft of the device. The length of the pivoted link may be adjusted to change the amplitude of oscillation of the output shaft.

1 Claim, 2 Drawing Figures

FISHING ROD JIGGING APPARATUS

BACKGROUND AND SUMMARY OF THE INVENTION

Various devices are known in the prior art which are useful for oscillating or "jigging" a fish rod to impart a desired movement to the bait or lure attached to the rod. While such devices have achieved a measure of success, numerous drawbacks have been noted such as excessive motor, gear and linkage noise, rather high cost, complexity and inaccessibility of component parts for easy adjustment and servicing.

The present invention is intended to alleviate difficulites experienced with prior art devices. A simple, inexpensive device is provided which is entirely housed in a box-like housing except for the mounting block for a conventional rod-holder. Within the housing, a centrally located mounting plate supports the drive motor on one side of the plate and a gear and crank linkage on the other side of the plate. The plate and its attachments may be easily removed from the housing to facilitate adjustment or repair without requiring major disassembly of the device.

The drive crank of the device is adjustable in length to permit variation of the amplitude of oscillation of the fishing rod.

DETAILED DESCRIPTION OF THE PREFERRED EMBODIMENT

Figure 1:
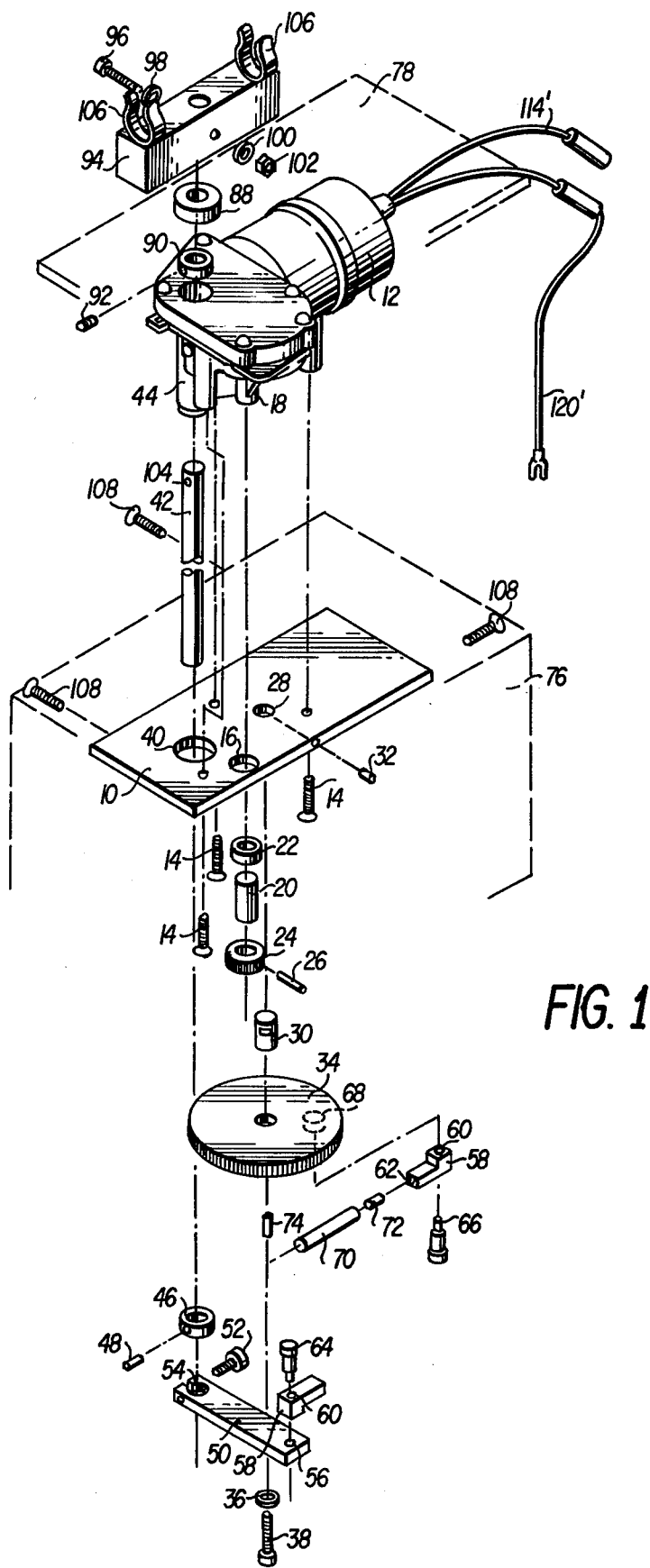
FIG. 1 shows an exploded, perspective view of the drive linkages of the invention.

There follows a detailed description of a preferred embodiment of the invention, reference being had to the drawing in which like reference numerals identify like elements of structure in each of the figures.

FIG. 1 shows an exploded, perspective view of the internal components of a jigging apparatus according to the invention. A rectangular mounting plate 10 which may be made from aluminum or other suitable material is provided which supports a drive motor 12. In the illustrated embodiment, drive motor 12 is a modified windshield wiper motor having a typical right angle drive via a worm gear mechanism, for example (not shown). A plurality of flat head screws 14 are used to attach drive motor 12 to rectangular mounting plate 10. A hole 16 is provided in mounting plate 10 through which the rotational output boss 18 of drive motor 12 is directed. A drive shaft 20 extends from boss 18 through a nylon bushing 22 which is received in hole 16. A drive gear 24 which preferably is made from aluminum or other lightweight metal, is secured to the lower end of drive shaft 20 by means such as a pin 26.

An additional hole 28 is provided in rectangular mounting plate 10 at a location spaced from hole 16 for receiving one end of a driven shaft 30 which is secured in mounting plate 10 by means such as a socket head set screw 32. A driven gear 34, which may be of aluminum or nylon construction depending upon whether the device is to be used in fresh or salt water applications, is attached to the lower end of driven shaft 30 by means such as a washer 36 and cap screw 38. In the illustrated embodiment, the drive ratio between drive gear 24 and driven gear 34 is approximately 1 to 4.

Spaced from holes 16 and 28 in rectangular mounting plate 10 is a further hole 40 through which the output shaft 42 of the device extends as assembled. Shaft 42 extends upwardly through a boss 44 in the housing of drive motor 12 and out of the device, as will be described subsequently herein. A nylon collar 46 is attached to shaft 42 in position to be rotatably received in hole 40, by means such as a socket head set screw 48. At the lower end of output shaft 42, a link 50 is attached by a cap screw 52 which compresses the diameter of a bore 54 provided in one end of link 50. A tapped bore 56 is provided at the opposite end of link 50.

Link 56 and driven gear 34 are interconnected by a crank arm or link which comprises a pair of spaced, L-shaped pivots 58. Each pivot 58 comprises a vertical through bore 60 and a horizontal tapped bore 62. A pair of socket head cap screws 64, 66 pass through bores 60 to attach pivots 58 to link 50 and to driven gear 34. Cap screw 66 threads into a nut or similar threaded insert 68 which is embedded in driven gear 34 as indicated in phantom. Tapped bores 62 are interconnected by a link 70 which has a tapped central bore in which a pair of headless screws 72, 74 are adjustably received. By selectively positioning screws 72, 74 relative to pivots 58 and link 70, the overall length of the crank arm or link extending between driven gear 34 and link 50 may be adjusted to change the amplitude of oscillation of output shaft 42.

Figure 2:
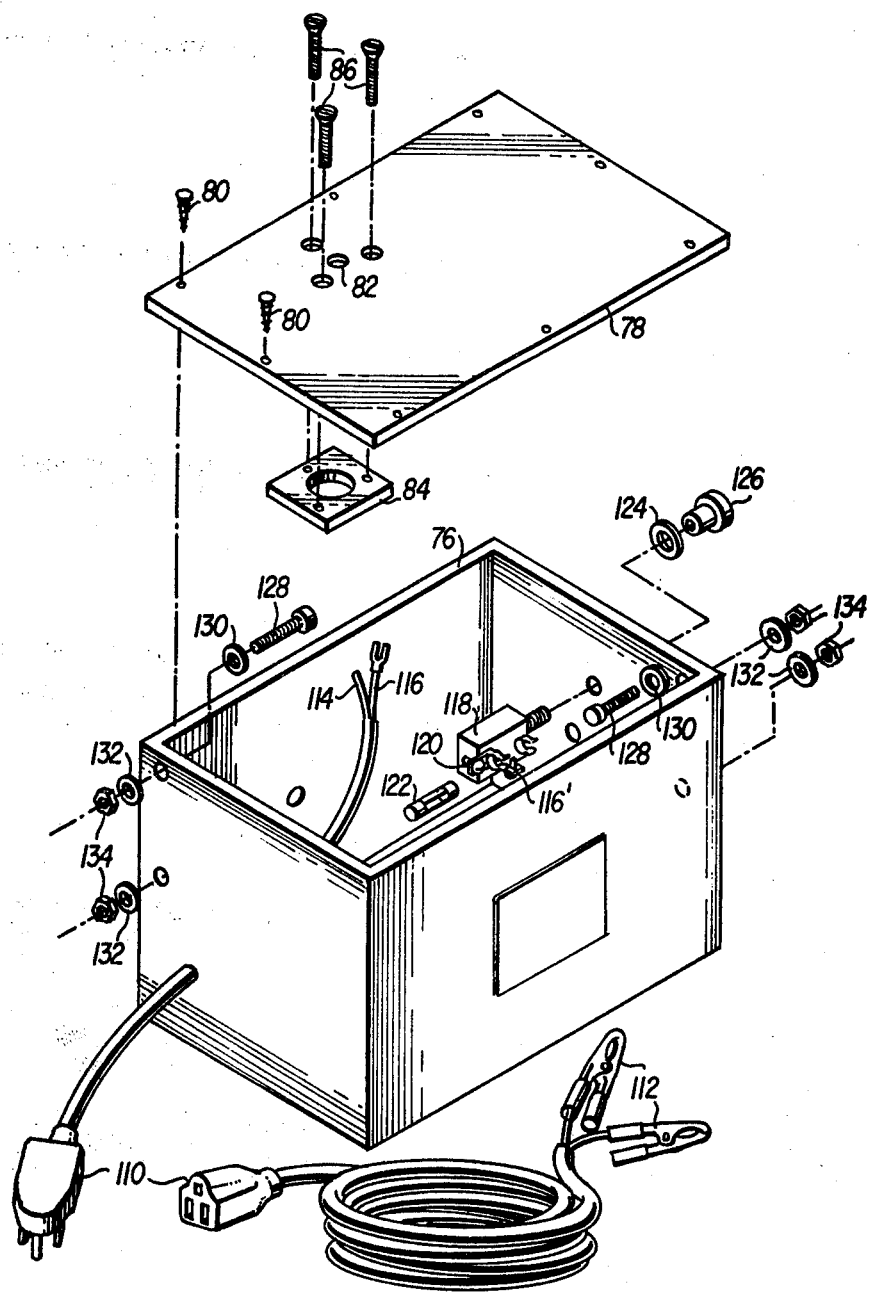
FIG. 2 shows an exploded, perspective view of the housing for the components of FIG. 1.

Turning to FIG. 2, the housing of the invention is seen to comprise a rectangular box 76 having vertical sides which may be made from wood, fiberglass, mineral filled plastic or extruded metal as preferred. The box has a removable top 78 and a removable bottom (not shown) secured to the box by means such as plurality of flat head screws 80. The output end of shaft 42 extends through a bore 82 provided in removable top 78. Bore 82 is surrounded on the undersurface of removable top 78 by a bearing block 84 which is secured by means such as a plurality of flat head screws 86. As shown in FIG. 1, a bearing 88 is pressed into bearing block 84 to provide rotational support for the output end of shaft 42. A nylon collar 90 is mounted on shaft 42 to provide additional rotational support within boss 44 of drive motor 12. A socket set screw 92 secures collar 90 to output shaft 42.

A mounting block which preferably is wooden, is attached to the output end of shaft 42 by cap screw 96, washers 98, 100 and nut 102 via a bore 104 provided at the end of shaft 42. A pair of U-shaped, spaced clips 106 or other rod holding device of a type generally known in the prior art is secured to mounting block 94 to provide a means for attaching a fishing rod to the jigging apparatus according to the invention. Finally, rectangular mounting plate 10 is secured within box 76 by means such as a plurality of flat head screws 108.

Power for drive motor 12 is preferably obtained from means such as a conventional automobile battery or other source of DC power via a connector cord 110 having a pair of alligator clips 112 for attachment to conventional battery terminals. Cord 110 comprises an inner conductor 114 which is attached to power conductor 114' of drive motor 12. A second inner conductor 116 of connector cord 110 is attached to terminal 116' of a conventional on-off switch 118. Terminal 120 of switch 118 is attached to conductor 120' of drive motor 12 to complete the power circuit of the invention. A fuse 122 is provided to protect the apparatus against electrical overloads should jamming or other malfunction occur. A nut 124 and knob 126 are used to attach on-off switch 118 to housing 76 in the conventional manner. In use, the invention preferably is attached to one gunwhale of the fisherman's boat by means of a bracket (not shown) which may be affixed to the housing by a plurality of cap screws 128, washers 130, 132 and nuts 134, as illustrated.

In use, the invention is attached to the boat in the manner previously described or in any other convenient manner and alligator clips 112 are attached to the battery or other source of power. Switch 118 is closed to apply power to drive motor 12 which rotates drive gear 24. Driven gear 34 rotates in response thereby pulling the crank arm comprising link 70 which imparts an oscillating movement to link 50 and output shaft 42. Thus, a fishing rod mounted in clips 106 is given a repeating fore and aft movement which jigs the bait or lure through the water to attract the fish. If it is desired to adjust the amplitude of movement of the device, the bottom of housing 76 is removed, thereby permitting the assembly of motor 12 and the gear train driven thereby to be removed with rectangular mounting plate 10 after attachment screws 108 have been removed. The effective length of the crank arm comprising links 70 may then be adjusted as desired. Similarly, when it is desired to service the device, removal of its interior components is facilitated by the mutual attachment of all components to a single mounting plate 10.

Having described my invention in sufficient detail to enable those skilled in the art to make and use it, I claim:

1. An apparatus for controlling the motion of a fishing rod, comprising:
   a housing having a top, a bottom and enclosing sides;
   a mounting plate located in said housing between said top and said bottom;
   a motor mounted on one side of and supported by said mounting plate;
   a drive gear mounted on the opposite side of said mounting plate and directly connected by a drive shaft to said motor for rotation thereby;
   an output shaft mounted for rotation in said housing and extending exteriorly thereof;
   a first link located in said housing and connected to said output shaft for rotation therewith;
   means for supporting a fishing rod exteriorly of said housing, said means being attached to said output shaft for rotation therewith;
   a second link located in said housing and pivotally connected through respective first and second pivot members to said driven gear and said first link, whereby said output shaft is caused to oscillate as said driven gear is rotated by said motor through said drive gear.
   said second link formed with threaded end portions, and a pair of screws extending from said end portions into engagement with said pivot members allowing the effective length of said second link to be adjusted, whereby the amplitude of said oscillation is correspondingly varied.

* * * * *